(12) United States Patent
Gao

(10) Patent No.: US 8,855,219 B2
(45) Date of Patent: Oct. 7, 2014

(54) FLEXIBLE SELF-ADAPTIVE DIFFERENTIAL SYSTEM TO IMPROVE TRANSMISSION EFFICIENCY

(75) Inventor: Zhi Gao, Shenzhen (CN)

(73) Assignee: STMicroelectronics (Shenzhen) R&D Co., Ltd., Shenzhen (CN)

( * ) Notice: Subject to any disclaimer, the term of this patent is extended or adjusted under 35 U.S.C. 154(b) by 277 days.

(21) Appl. No.: 12/924,884

(22) Filed: Oct. 7, 2010

(65) Prior Publication Data

US 2011/0142165 A1   Jun. 16, 2011

(30) Foreign Application Priority Data

Dec. 15, 2009  (CN) .......................... 2009 1 0259164

(51) Int. Cl.
*H04L 27/00* (2006.01)
*H04L 1/20* (2006.01)
*H04L 25/08* (2006.01)
*H04L 1/00* (2006.01)

(52) U.S. Cl.
CPC .............. *H04L 25/085* (2013.01); *H04L 1/203* (2013.01); *H04L 1/003* (2013.01)
USPC .............................. 375/259; 375/295; 375/296

(58) Field of Classification Search
CPC ........................................................ H04L 25/08
USPC .......................................... 375/296, 259, 295
See application file for complete search history.

(56) References Cited

U.S. PATENT DOCUMENTS

| | | | |
|---|---|---|---|
| 5,386,589 A * | 1/1995 | Kanai ............................ 455/423 |
| 6,323,699 B1 * | 11/2001 | Quiet ............................ 327/108 |
| 8,417,838 B2 * | 4/2013 | Tamasi et al. ...................... 710/8 |
| 2004/0057525 A1 * | 3/2004 | Rajan et al. .................... 375/257 |
| 2007/0001704 A1 * | 1/2007 | O'Mahony ..................... 324/765 |
| 2007/0173216 A1 * | 7/2007 | Blum ............................ 455/212 |
| 2007/0281755 A1 * | 12/2007 | Dwelley ........................ 455/572 |
| 2008/0037594 A1 * | 2/2008 | Hornbuckle et al. .......... 370/537 |
| 2011/0006804 A1 * | 1/2011 | Gay et al. ........................ 326/30 |
| 2011/0075740 A1 * | 3/2011 | Ferraiolo et al. .............. 375/257 |

* cited by examiner

*Primary Examiner* — Erin File
(74) *Attorney, Agent, or Firm* — Gardere Wynne Sewell LLP

(57) ABSTRACT

A system and method for transmitting data. The system and method is configured to dynamically implement one of a differential signaling method or a single-ended signaling method during a transmission of data. The signaling method is selected based on a measured interference level during the transmission of data. The implementation of the signaling method is performed without interrupting the data transmission.

20 Claims, 5 Drawing Sheets

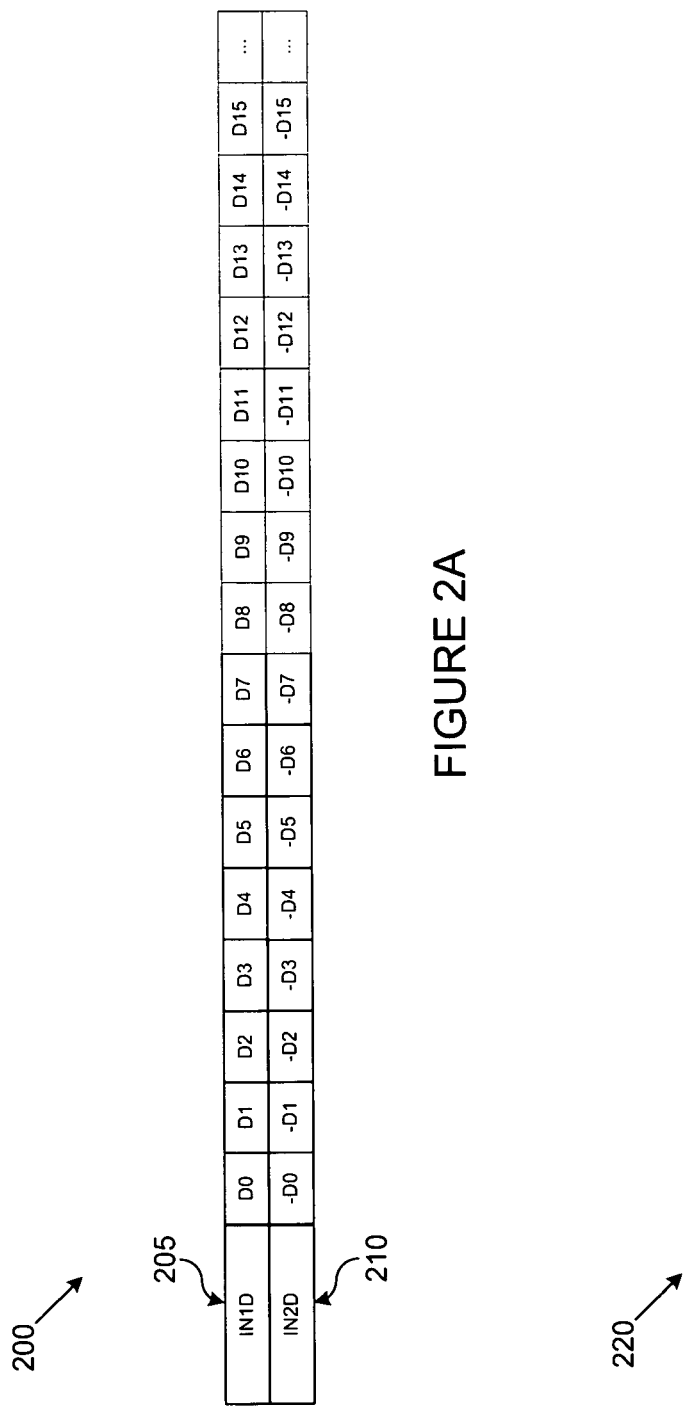
FIGURE 2A
FIGURE 2B

FLEXIBLE SELF-ADAPTIVE DIFFERENTIAL SYSTEM TO IMPROVE TRANSMISSION EFFICIENCY

CROSS-REFERENCE TO RELATED APPLICATION(S) AND CLAIM OF PRIORITY

The present application claims priority under 35 U.S.C. §119(a) to a Chinese patent application filed in the Chinese Intellectual Property Office on Dec. 15, 2009 and assigned Serial No. 200910259164.5, the entire disclosure of which is hereby incorporated by reference.

TECHNICAL FIELD

The disclosure relates generally to data transmission systems, and in particular to differential transmission systems.

BACKGROUND

Differential signaling is a method of transmitting information electrically by means of two complementary signals sent on two separate lines. The technique can be used for both analog signaling, as in some audio systems, and digital signaling, as in RS-422, RS-485, Ethernet (twisted-pair only), PCI Express and USB. The opposite technique, which is more common but lacks some of the benefits of differential signaling, is called single-ended signaling.

In differential signaling, at one end of a transmission channel connection, a receiving device reads the difference between the two signals. Since the receiver ignores the wires' voltages with respect to ground, small changes in ground potential between transmitter and receiver do not affect the receiver's ability to detect the signal.

SUMMARY

Embodiments of the present disclosure provide an article of manufacture for transmitting data. The article of manufacture includes a computer readable medium. The computer readable medium includes a plurality of instructions configured to cause a processor to determine an interference level on a transmission channel; dynamically implement a signaling method corresponding to the interference level on the transmission channel; and transmit data utilizing the selected signaling method.

Embodiments of the present disclosure provide a system for data communications. The system includes a transmitter adapted to determine an interference level on a transmission channel. The transmitter is configured to dynamically implement a signaling method based on the interference level. The system further includes a receiver configured to receive data transmitted using the implemented signaling method.

Embodiments of the present disclosure provide a method for data communications. The method includes determining an interference level on a transmission channel. The method further includes dynamically implementing a signaling method based on the interference level and transmitting data using the selected signaling method.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 2A illustrates a differential signaling transmission format according to embodiments of the present disclosure;

FIG. 2B illustrates a single-ended signaling transmission format according to embodiments of the present disclosure;

Before undertaking the DETAILED DESCRIPTION OF THE INVENTION below, it may be advantageous to set forth definitions of certain words and phrases used throughout this patent document. The term "packet" refers to any information-bearing communication signal, regardless of the format used for a particular communication signal. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

DETAILED DESCRIPTION

FIGS. 1A through 4C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless or wireline communication network.

Figure 1A:
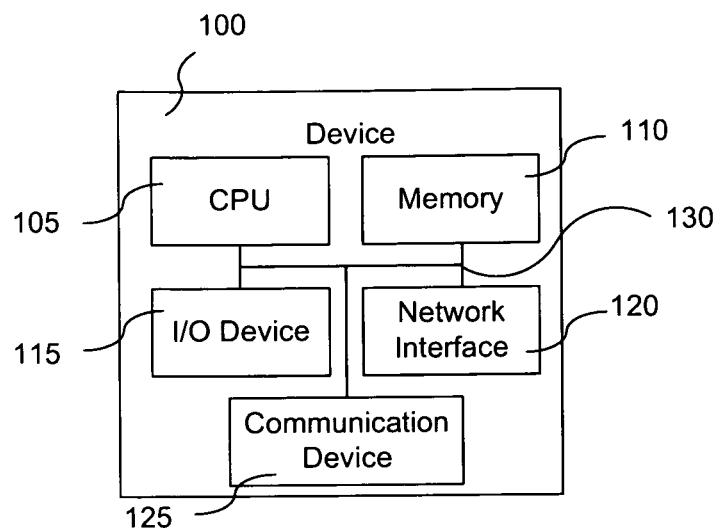
FIG. 1A illustrates a device that may be used to transmit data according to embodiments of the present disclosure.

FIG. 1A illustrates a device 100 that may be used to transmit data according to embodiments of the present disclosure. It would be understood that illustration of the device merely is exemplary and other devices can be utilized without departing from the scope of the present disclosure.

The device 100 may be a computer, personal digital assistant (FDA), cellular telephone, or any other device capable of transmitting, processing, and/or receiving signals via wireless and/or wireline communication links. The device 100 may include components such as a central processing unit ("CPU") 105 (e.g., a processor or special purpose controller), a memory unit 110, an input/output ("I/O") device 115, a network interface 120, and a communication device 125. The network interface 120 may be, for example, one or more network interface cards (NICs) that are each associated with a media access control (MAC) address. The components 105, 110, 115, 120 and 125 are interconnected by one or more communication links 130 (e.g., a bus). It is understood that the device 100 may be differently configured and that each of the listed components may actually represent several different components. For example, the CPU 105 may actually represent a multi-processor or a distributed processing system; the memory unit 110 may include different levels of cache memory, main memory, hard disks, and remote storage locations; and the I/O device 115 may include monitors, keyboards, and the like. The network interface 120 enables the device 100 to connect to a network. The communication device 125 can include a plurality of transmission antennas configured to transmit data via a wireless communication medium and/or a plurality of receiving antennas configured to receive data from a wireless communications medium. In some embodiments, the communication device 125 includes transmitters and/or receivers configured to communicate data via an infrared medium, wireless fidelity (wifi) medium, and an acoustic medium.

Figure 1B:
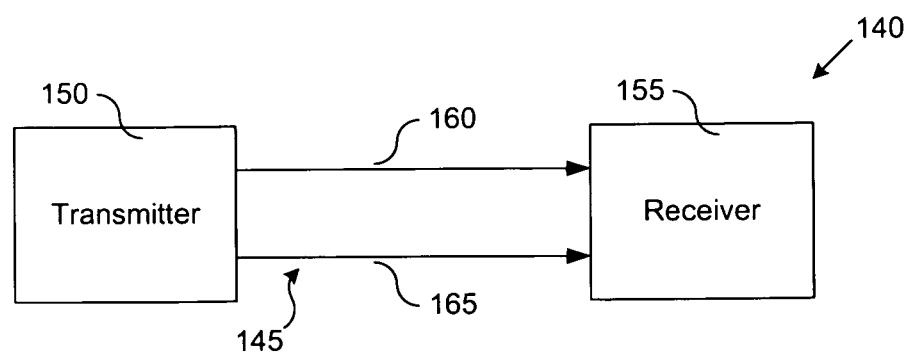
FIGS. 1B, 1C and 1D illustrate a communication system according to embodiments of the present disclosure.
Figure 1C:
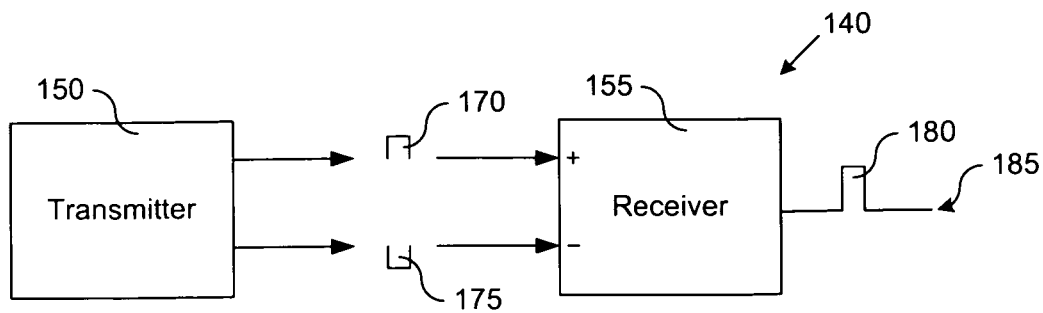
Figure 1D:
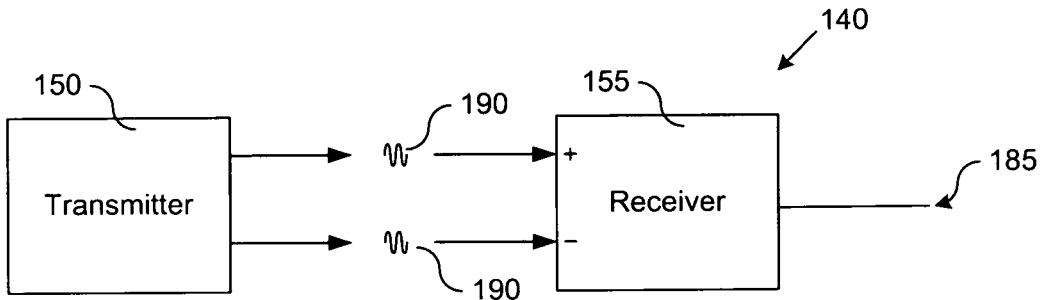

Referring now to FIGS. 1B, 1C and 1D a communications system 140 according to embodiments of the present disclosure is illustrated. It would be understood that illustration of the communication system 140 merely is exemplary and other communications systems can be utilized without departing from the scope of the present disclosure.

The system includes a transmitter 150 and a receiver 155. The transmitter 150 can include the same general structure as the device 100. In some embodiments, the communication device 125 in the transmitter 150 is configured to transmit data via a wireline medium. In some embodiments, the communications device 125 in the transmitter 150 includes a plurality of transmission antennas configured to transmit data via a wireless medium. Additionally, the receiver 155 can include the same general structure as the device 100. In some embodiments, the communication device 125 in the receiver 155 is configured to receive data via a wireline medium. In some embodiments, the communications device 125 in the receiver 155 includes a plurality of receiving antennas configured to receive data via a wireless medium.

A transmitter 150 transmits data to a second device the receiver 155. The data is transmitted differentially along a transmission channel 145. The transmission channel 145 includes Line Input One 160 (IN1) and Line Input Two 165 (IN2). The signal levels in each of IN1 160 and IN2 165 are opposite in order to counter the effects of noise. Accordingly, a first pulse 170 on IN1 160 is opposite to a second pulse 175 on IN2 165 as illustrated in FIG. 1C. The first pulse 170 and the second pulse 175 are transmitted substantially simultaneously. The receiver 155 is configured to sum the differential signals to obtain an output pulse 180 on an output line 185. However, if a noise 190 occurs on the lines IN1 160 and IN2 165, the receiver 155 will not produce a pulse on the output line 185 since the noise is not differential.

FIG. 2A illustrates a frame format 200 according to embodiments of the present disclosure. It would be understood that illustration of the frame format 200 merely is exemplary and other formats can be utilized without departing from the scope of the present disclosure.

Transmitting differential signals IND1 205 and IND2 210 inhibit the errors caused by interference on the transmission channel 145 (e.g., noise on IN1 160 and/or IN2 165) such that the data transmission is reliable. Accordingly, to inhibit the effects of noise, the system 140 utilizes additional bandwidth to transmit the data.

One measure of the interference (e.g., noise) on the transmission channel 145 (IN1 160 and/or IN2 165) is the level of erroneous bits in a transmission. The level of erroneous bits in a transmission is the Bit Error Rate (BER). The BER is the ratio of the number of bits, elements, characters, or blocks incorrectly received to the total number of bits, elements, characters, or blocks sent during a specified time interval. Examples of the BER are (a) transmission BER, i.e., the number of erroneous bits received divided by the total number of bits transmitted; and (b) information BER, i.e., the number of erroneous decoded (corrected) bits divided by the total number of decoded (corrected) bits.

In some embodiments, a single-ended signaling is utilized by the transmitter 150. In single-ended signaling, the transmitter 150 generates a single voltage that the receiver 155 compares with a fixed reference voltage, both relative to a common ground connection shared by both ends. An RS-232 system is an example of single-ended signaling, which uses ±12V to represent a signal (e.g., a logical "1"), and anything less than ±3V to represent the lack of a signal (e.g., a logical "0"). The high voltage levels give the signals some immunity from noise, since few naturally occurring signals can create that sort of voltage. Single-ended signaling also has the advantage of requiring only one wire per signal in some embodiments.

FIG. 2B illustrates a frame format 220 according to embodiments of the present disclosure. It would be understood that illustration of the frame format 220 merely is exemplary and other formats can be utilized without departing from the scope of the present disclosure.

In some embodiments, the communication system 140 is adapted to vary the method utilized to transmit data. In such embodiments, the transmitter 150 is configured to determine a level of interference on the transmission channel 145, e.g., IN1 160 and/or IN2 165. If the interference level is above a certain threshold, the transmitter 150 is configured to transmit the data differentially. However, if the interference level is below a certain threshold, the transmitter 150 is configured to transmit the data via a single-ended communication format. Further, the transmitter is configured to dynamically change transmission formats from differential to single-ended and from single-ended to differential based on a change in the interference level. The receiver 155 is configured to determine what format, e.g., differential or single-ended, was utilized to transmit the data. Thus, the receiver 155 is configured to receive, and decode as needed, the data from the transmitter 150 in both the differential format and the single-ended format.

Figure 3:
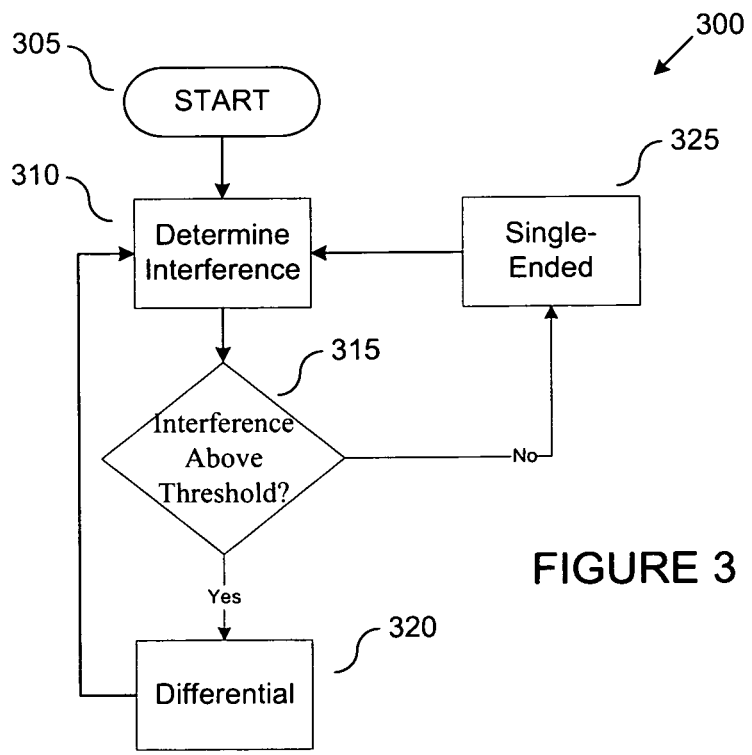
FIG. 3 illustrates a simple flow diagram for selecting signaling methods according to embodiments of the present disclosure.

FIG. 3 illustrates a simple flow diagram for selecting transmission formats according to embodiments of the present disclosure. It would be understood that illustration of the transmission format selection process merely is exemplary and other transmission format selection processes can be utilized without departing from the scope of the present disclosure.

The transmitter 150 starts the process to transmit data in step 305. In step 310, the transmitter 150 determines an interference level on the transmission channel, e.g., on IN1 160 and/or IN2 165. In one embodiment, the interference level (e.g., noise) on the transmission channel 145 may be determined by the BER for the transmission channel 145. In some embodiments, the transmitter 150 makes an transmission format selection based on factors that indicate an interference in the voltage or temperature on the transmission channel 145. For simplicity, BER will be utilized in this example. However, it would be understood that other factors can be utilized without departing from the scope of this disclosure.

If the interference is above a specified threshold (e.g., BER>threshold) in step 315, then the transmitter 150 transmits the data differentially in step 320. Thereafter, the process returns to step 310 wherein the transmitter 150 continues to determine the interference level on the transmission channel 145.

If the interference is equal to or below a specified threshold (e.g., BER<threshold) in step 315, then the transmitter 150 transmits the data in a single-ended format in step 325. The transmitter 150 transmits the data in a single-ended format by transmitting one or more data bits substantially simultaneously via IN1 160 and IN2 165. The receiver 155 is configured to combine the data received via IN1 1605 and IN2 165. In additional embodiments, the data transmitted via IN1 160 and IN2 165 is encoded utilizing an error correction coding such as, but not limited to, a repetition scheme, parity scheme (e.g., even-check or odd-check), checksum, Cyclic Redundancy Check (CRC), Hamming distance based checks, Hash function, horizontal and vertical redundancy check and polarity schemes. In such embodiments, the receiver 155 is configured to decode and combine the data received on IN1 160 and IN2 165. In some embodiments, the transmitter 150 transmits a first data via IN1 160 while transmitting a second data via IN2 165. In such embodiments, the receiver 155 is configured to receive the different data (e.g., the first data and second data) via IN1 160 and IN2 165. Thereafter, the process returns to step 310 wherein the transmitter 150 continues to determine the interference level on the transmission channel 145.

Figure 4A:
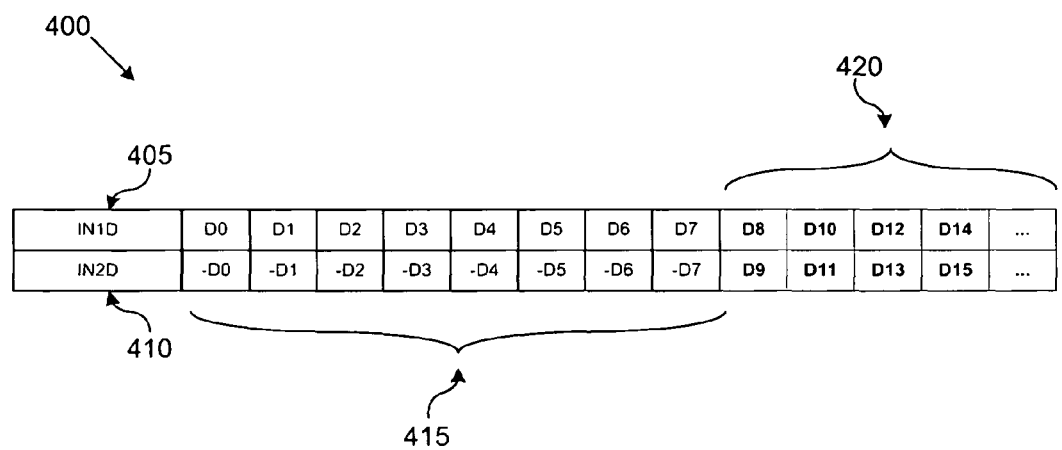
FIG. 4A illustrates a flexible differential signaling transmission format according to embodiments of the present disclosure.

Referring now to FIG. 4A, a frame format 400 for data transmissions according to embodiments of the present disclosure is illustrated. It would be understood that illustration of the frame format 400 merely is exemplary and other frame formats can be utilized without departing from the scope of the present disclosure.

The transmitter 150 transmits data along IN1 160 and IN2 165. IN1D 405 represents a frame format for data transmitted along IN1 160. IN2D 410 represents a frame format for data transmitted along IN2 165. The transmitter 150 determines that the interference on IN1 160 and IN2 165 is above a threshold level. Therefore, the transmitter 150 transmits the first eight (8) bits of data 415 (e.g., D0 to D7) utilizing the differential method (e.g., differentially). Thereafter, the transmitter 150 determines that the interference level drops below the threshold. Therefore, the transmitter 150 transmits the second eight (8) bits of data 205 (e.g., D8 to D15) via the single-ended method. Therefore, the transmitter dynamically changes the transmission format from a differential system to a single-ended system.

Further, as illustrated in FIG. 4A, the transmitter 150 transmits D8, D10 D12 and D14 along IN1 160 and D9, D11, D13 and D15 along IN2 165. Therefore, the flexible differential transmission requires less time to transmit data than traditional differential systems.

Figure 4B:
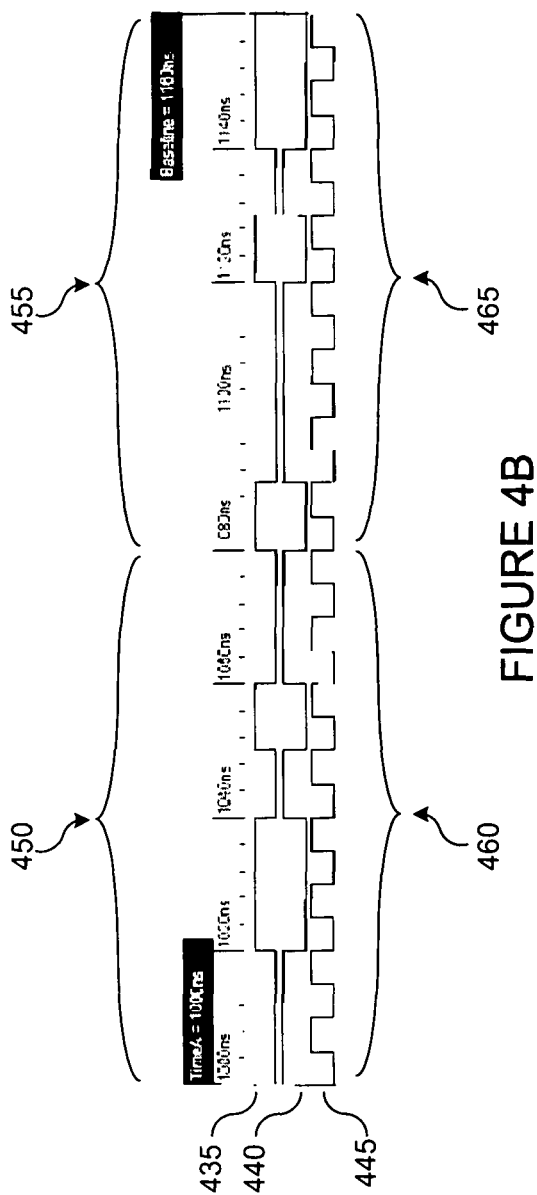
FIG. 4B illustrates data transmissions utilizing a differential signaling method according to embodiments of the present disclosure.
Figure 4C:
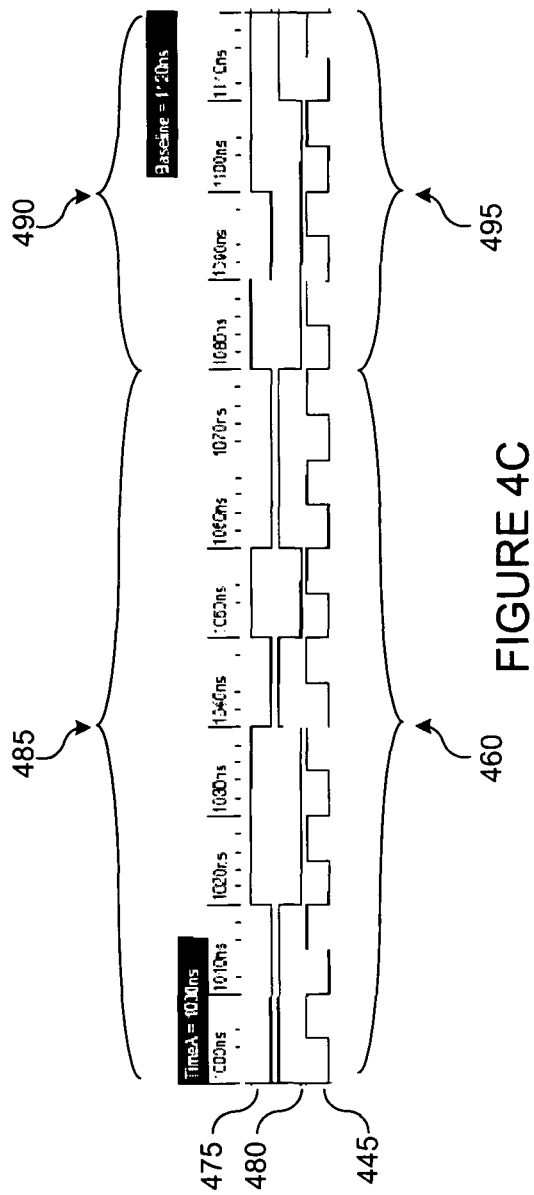
FIG. 4C illustrates data transmissions utilizing a flexible differential signaling method according to embodiments of the present disclosure.

Referring now to FIGS. 4B and 4C, two transmission formats according to embodiments of the present disclosure are illustrated. In FIG. 4B, the transmitter 150 transmits the data using a traditional differential transmission 430 according to embodiments of the present disclosure. The transmitter 150 transmits two bytes 450 and 455. The first byte 450 is transmitted along IN1 160 and IN2 165 in a first time interval. The second byte 455 is transmitted along IN1 160 and IN2 165 in a second time interval. IN1D 435 represents a frame format for data transmitted along IN1 160. IN2D 440 represents a frame format for data transmitted along IN2 165. The data are coded according to the following:
IN1 435 as clocked by clock signal 445:
00110100 in the first time interval 460.
10001011 in the second time interval 465.
IN2 440 as clocked by clock signal 445:
11001011 in the first time interval 460.
01110100 in the second time interval 465.

Thus, in the above example, the transmitter 150 transmits the data to the receiver 155 in one-hundred-sixty (160) nanoseconds.

In FIG. 4C, the transmitter 150 transmits the data utilizing a flexible differential transmission 470 according to embodiments of the present disclosure. The transmitter 150 transmits two bytes 485 and 490. The first byte 485 is transmitted along IN1 160 and IN2 165 in a first time interval. The second byte 490 is transmitted along IN1 160 and IN2 165 in a second time interval. IN1D 475 represents a frame format for data transmitted along IN1 160. IN2D 480 represents a frame format for data transmitted along IN2 165. The data are coded according to the following:
IN1 475 as clocked by clock signal 445:
00110100 in the first time interval 460.
1011 in the second time interval 495 which is half the second time interval 465 illustrated in FIG. 4B.
IN2 480 as clocked by clock signal 445:
11001011 in the first time interval 460.
0001 in the second time interval 495 which is half the second time interval 465 illustrated in FIG. 4B.

Thus, in the above example, the transmitter 150 transmits the data to the receiver 155 in one-hundred-twenty (120) nanoseconds. Further, the second byte 490 transmitted by the flexible differential transmission is transmitted in half the time required to transmit the second byte 455 transmitted by the traditional differential transmission.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An article of manufacture for transmitting data, the article of manufacture comprising:
a non-transitory computer readable medium; and
a plurality of instructions wherein at least a portion of the plurality of instructions are storable in the computer readable medium, and further wherein the plurality of instructions are configured to cause a processor to:
determine a first interference level on a transmission channel;
based on a comparison of the determined first interference level on the transmission channel to a threshold level, select one of a single-ended signaling method and a differential signaling method; and
transmit data on the transmission channel using the selected one of the single-ended and differential signaling methods until a second interference level on the transmission channel is determined.

2. The article of manufacture of claim 1, further comprising determining a bit error rate.

3. The article of manufacture of claim 2, wherein a first of the single-ended and differential signaling methods is implemented when the bit error rate is equal to or below the threshold level and a second of the single-ended and differential signaling methods is implemented when the bit error rate is above the threshold level.

4. The article of manufacture of claim 1, wherein the selected one of the single-ended and differential signaling methods is a first one of the single-ended and differential signaling methods, and wherein the processor is further configured to:
 determine the second interference level on the transmission channel;
 based on a comparison of the determined second interference level on the transmission channel to the threshold level, select a second one of the single-ended and differential signaling methods; and
 transmit data on the transmission channel using the selected second one of the single-ended and differential signaling methods.

5. The article of manufacture of claim 4, wherein the second one of the single-ended and differential signaling methods is different than the first one of the single-ended and differential signaling methods.

6. The article of manufacture of claim 1, wherein the data is transmitted using an error correction coding.

7. An article of manufacture for transmitting data, the article of manufacture comprising:
 a non-transitory computer readable medium; and
 a plurality of instructions, wherein at least a portion of the plurality of instructions are storable in the computer readable medium, and wherein the plurality of instructions are configured to cause a processor to:
  send a first data byte from a frame on a transmission channel using a differential signaling method;
  determine an interference level on the transmission channel; and
  based on a comparison of the determined interference level on the transmission channel to a threshold level, send a data byte subsequent to the first data byte from the frame on the transmission channel using a single-ended signaling method when the determined interference level is less than the threshold level.

8. A system for data communications, the system comprising:
 a transmitter configured to:
  determine an interference level on a transmission channel, and
  based on a comparison of the determined interference level on the transmission channel to a threshold level, select and implement one of a single-ended signaling method and a differential signaling method; and
 a receiver configured to receive data transmitted from the transmitter using the implemented signaling method.

9. The system of claim 8, wherein the transmitter is configured to determine an interference level on a transmission channel by determining a bit error rate.

10. The system of claim 9, wherein the transmitter is configured to implement a first of the single-ended and differential signaling methods when the bit error rate is equal to or below the threshold level and a second of the single-ended and differential signaling methods when the bit error rate is above the threshold level.

11. The system of claim 10, wherein the first signaling method comprises a single-ended signaling method.

12. The system of claim 10, wherein the second signaling method comprises a differential signaling method.

13. The system of claim 8, wherein the transmitter is configured to send a first data byte using a differential signaling method and a second data byte using a single-ended signaling method.

14. The system of claim 8, wherein the data is transmitted using an error correction coding.

15. A method for data communications, the method comprising:
 determining, by a communications system, an interference level on a transmission channel;
 based on a comparison of the determined interference level on the transmission channel to a threshold level, selecting and implementing one of a single-ended signaling method and a differential signaling method; and
 transmitting data using the selected signaling method.

16. The method of claim 15, wherein the interference level is determined based upon a bit error rate.

17. The method of claim 16, further comprising selecting a first of the single-ended and differential signaling methods when the bit error rate is equal to or below the threshold level and a second of the single-ended and differential signaling methods when the bit error rate is above the threshold level.

18. The system of claim 17, wherein the first signaling method comprises a single-ended signaling method.

19. The system of claim 17, wherein the second signaling method comprises a differential signaling method.

20. The system of claim 15, further comprising:
 sending a first data byte using a differential signaling method; and
 sending a second data byte using a single-ended signaling method.

* * * * *